US012609127B2

(12) United States Patent
Solomon et al.

(10) Patent No.: US 12,609,127 B2
(45) Date of Patent: Apr. 21, 2026

(54) NEUTRALIZING DISTORTION IN AUDIO DATA

(71) Applicants: Merrill Solomon, Potomac, MD (US); Glenn Bernard, Melbourne, FL (US)

(72) Inventors: Merrill Solomon, Potomac, MD (US); Glenn Bernard, Melbourne, FL (US)

( * ) Notice: Subject to any disclaimer, the term of this patent is extended or adjusted under 35 U.S.C. 154(b) by 159 days.

(21) Appl. No.: 18/499,296

(22) Filed: Nov. 1, 2023

(65) Prior Publication Data

US 2024/0153520 A1 May 9, 2024

Related U.S. Application Data

(60) Provisional application No. 63/422,120, filed on Nov. 3, 2022.

(51) Int. Cl.
*G10L 21/0216* (2013.01)
*G10L 15/06* (2013.01)
*G10L 21/02* (2013.01)

(52) U.S. Cl.
CPC ........ *G10L 21/0216* (2013.01); *G10L 15/063* (2013.01)

(58) Field of Classification Search
CPC .... G10L 21/0216; G10L 15/063; G10L 21/02
USPC ........................................................ 704/227
See application file for complete search history.

(56) References Cited

U.S. PATENT DOCUMENTS

| | | | |
|---|---|---|---|
| 4,291,277 A | 9/1981 | Davis et al. | |
| 7,215,787 B2 | 5/2007 | Sternad et al. | |
| 7,535,974 B1 | 5/2009 | Shirali | |
| 7,873,172 B2 | 1/2011 | Lashkari | |
| 8,280,730 B2 | 10/2012 | Song et al. | |
| 9,485,589 B2 | 11/2016 | Fitz | |
| 9,973,633 B2 * | 5/2018 | Schroeter | H04R 29/00 |
| 10,014,002 B2 | 7/2018 | Koretzky et al. | |
| 10,897,276 B2 | 1/2021 | Megretski et al. | |
| 10,931,320 B2 | 2/2021 | Megretski et al. | |

(Continued)

FOREIGN PATENT DOCUMENTS

| | | | |
|---|---|---|---|
| EP | 3807878 B1 | 12/2023 | |
| WO | WO-2014077690 A1 * | 5/2014 | G10L 25/69 |

*Primary Examiner* — Hai Phan
*Assistant Examiner* — Ian Scott McLean
(74) *Attorney, Agent, or Firm* — Edell, Shapiro & Finnan, LLC

(57) ABSTRACT

A system and process for pre-distorting TV shows and/or movie media enables digital transmission of the media via MPEG4/AC3 (or AAC) or MPEG4/AC4 codec for broadcast or streaming over the Internet with enhanced speech intelligibility. Processing of the entire media file is performed using pre-distortion techniques and algorithms including NN models (which includes DNN, RNN, CNN, and similar NN models) that are trained on perceptual codec induced noise, quantization noise, dynamic power level adjustment, frequency response adjustment, pitch and glottal impulse response adjustment, and other techniques. The pre-distortion process is iterative, and all combinations of pre-distortions to combat perceptual codec noise are attempted, and the result scored by an automatic speech recognition engine. The best speech recognition results and highest intelligibility scores are considered to indicate the best pre-distortion to be applied. Once the best pre-distortion is applied, a single media file is then encoded for transmission.

20 Claims, 7 Drawing Sheets

Transmit Side Pre-Distortion Basic Concept

(56)         References Cited

U.S. PATENT DOCUMENTS

| | | | |
|---|---|---|---|
| 10,971,142 B2 | 4/2021 | Sriram et al. | |
| 11,100,941 B2 | 8/2021 | Sargsyan et al. | |
| 11,777,540 B1 * | 10/2023 | O'Shea | G06N 3/082 |
| | | | 455/114.3 |
| 11,812,223 B2 | 11/2023 | Santos et al. | |
| 12,001,950 B2 | 6/2024 | Zhang et al. | |
| 2021/0074294 A1 * | 3/2021 | Shellef | H04R 1/406 |
| 2023/0111606 A1 * | 4/2023 | He | H03F 1/3247 |
| | | | 455/114.3 |
| 2024/0163627 A1 | 5/2024 | Chen et al. | |
| 2024/0177726 A1 * | 5/2024 | Dai | G06N 3/08 |

* cited by examiner

FIG. 3

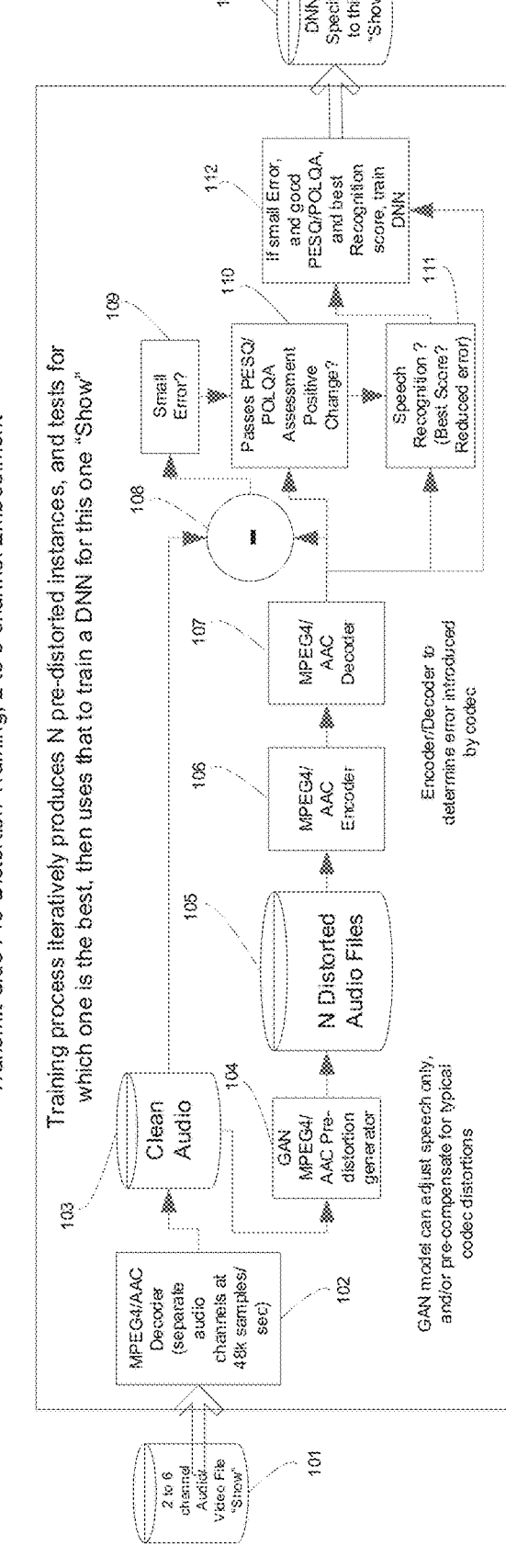

Transmit Side Pre-Distortion Training, 2 to 6-channel Embodiment

Training process iteratively produces N pre-distorted instances, and tests for which one is the best, then uses that to train a DNN for this one "Show"

101 — 2 to 6 channel Audio Video File "Show"

102 — MPEG4/AAC Decoder (separate audio channels at 48k samples/sec)

103 — Clean Audio

104 — GAN MPEG4/ AAC Pre-distortion generator

GAN model can adjust speech only, and/or pre-compensate for typical codec distortions 105 — N Distorted Audio Files 106 — MPEG4/ AAC Encoder 107 — MPEG4/ AAC Decoder Encoder/Decoder to determine error introduced by codec

108

109 — Small Error?

110 — Passes PESQ/ POLQA Assessment Positive Change?

111 — Speech Recognition? (Best Score? Reduced error?)

112 — If small Error, and good PESQ/POLQA, and best Recognition score, train DNN 113 — DNN Specific to this "Show"

FIG. 4

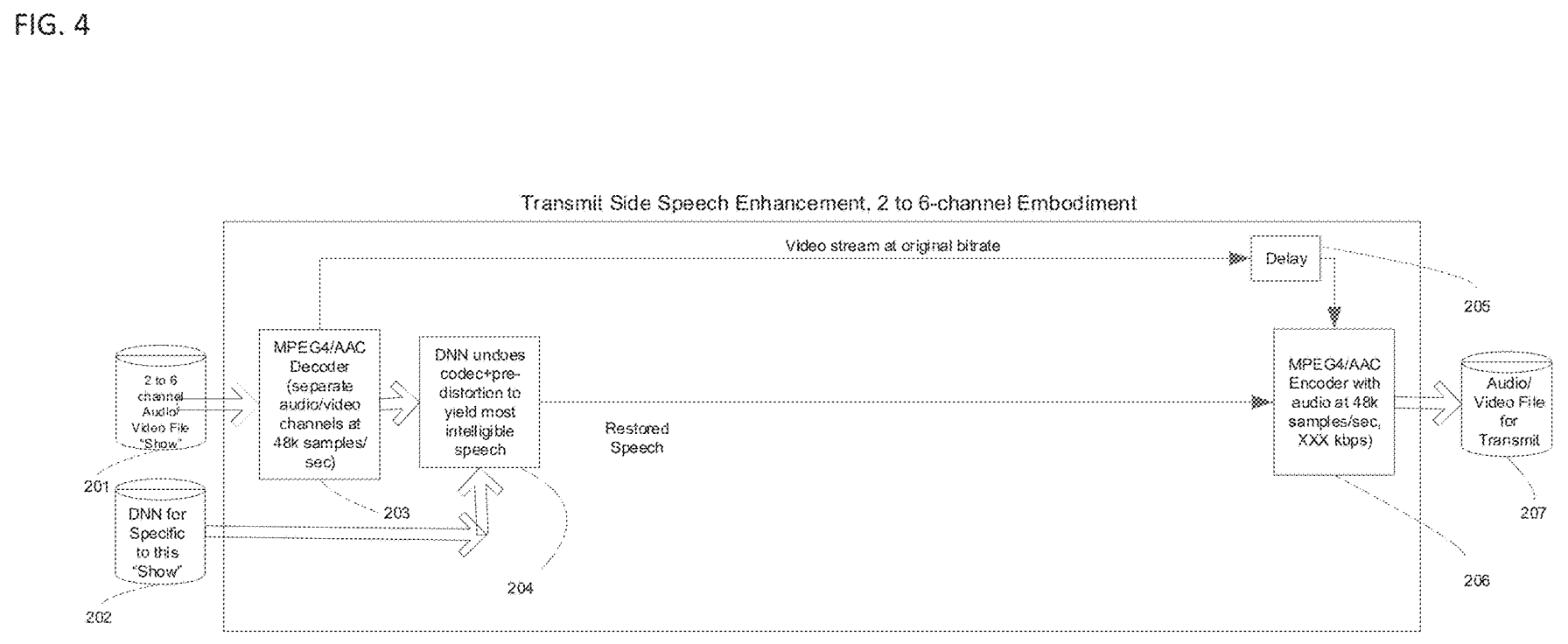

Transmit Side Speech Enhancement, 2 to 6-channel Embodiment 2 to 6 channel Audio/ Video File "Show" — 201

DNN for Specific to this "Show" — 202

MPEG4/AAC Decoder (separate audio/video channels at 48k samples/ sec)

203

DNN undoes codec+pre-distortion to yield most intelligible speech

204

Restored Speech

Video stream at original bitrate

Delay — 205

MPEG4/AAC Encoder with audio at 48k samples/sec, XXX kbps)

206

Audio/ Video File for Transmit — 207

NEUTRALIZING DISTORTION IN AUDIO DATA

CROSS-REFERENCE TO RELATED APPLICATIONS

This application claims priority to U.S. Provisional Patent Application Ser. No. 63/422,120, entitled "Pre-Transmission Neutralization of Distortion Occurring During Transmission of Audio Data" and filed on Nov. 3, 2022, the disclosure of which is hereby incorporated by reference in its entirety.

TECHNICAL FIELD

This application pertains to a system and method for processing audio data in a prerecorded TV show or movie to neutralize the distortion effects that occur in that audio information during transmission.

BACKGROUND

The audio in almost all TV shows and movies has a large dynamic range with the audio mixed for surround sound effects. Moreover, many of those shows and movies have action scenes in which the audio quickly ranges between very quiet to very loud, with both situations usually containing music in the background. These effects increasingly make the dialogue in those shows and movies less intelligible to the average viewer/listener, and especially so to the hearing impaired.

Compounding the above-mentioned problem is the fact that, depending on the compression rate required by the content distributor for transmission, the determining phonetic information in any given audio file (i.e., the audio information that discriminates one word from another in the dialogue) is deleted or degraded by the transmitting CODEC, thus further decreasing-dialogue intelligibility.

Systems are known that use predistortion to compensate analog and digital amplifier waveforms and single channel speech signals; however, such systems are incapable of handling complex multi-channel audio with speech, music, background noise, and sound effects mixed together.

SUMMARY

The system and method of present invention embodiments disclosed herein utilize pre-distortion of the complex audio signal prior to transmission to compensate for the known distortion introduced during transmission.

More specifically, the audio data in a TV Show and/or Movie is manipulated before transmission, in such a way as to neutralize the distorting effects that occur to that audio information during transmission. This manipulation is performed in order to make the dialogue in that show or movie, after transmission, significantly more understandable for the average viewer. Moreover, the system and process apply to any perceptual codec used for the purpose of transmission either via Broadcast, Cable, Satellite, or Streamed over the Internet.

The process for increasing the dialogue intelligibility, which could be a real-time, or non-real-time system, analyzes the entire Original Media File using special algorithms including neural network (NN) models (implemented as RNN, CNN, DNN, etc., models) trained on perceptual codec induced noise, quantization noise, dynamic power level adjustment, frequency response adjustment, phase, pitch, and glottal impulse response adjustment, as well as other techniques.

This modification process is reiterative and reinforcing; meaning that the process will continually loop back and try all possible combinations of the spectral constituents listed above until a post codec audio file, as determined by an automatic speech recognition engine, has a score equal to, or higher, than the speech recognition score of the original audio file. When that score is reached it will become the final media file and will be encoded for transmission to the viewer using the codec preferred by the distributor, at any compression rate desired by that distributor.

The present system and method perform modification of the audio tracks at the transmit side so that the transmitted audio/video media stream has improved speech intelligibility. This capability also will benefit closed-captioning service providers using pre-release recordings. Processing is applied before the creation of the MPEG4/AC3 (AAC) codec stream. This system will also support the newer MPEG-AC4 codec with the separate dialog channel. This is the new Dolby system intended for ATSC 4 broadcast market and this AC4 codec will likely be built into all new TVs, however, most existing TVs are likely unable to be updated to accommodate this, primarily because of the remote control (not the smartness of the TV), which lacks the controls for selecting the dialog track or increasing/decreasing the volume. Thus, for many, this rollout to AC4 will take a long time, and is hampered by the lack of media already encoded in AC4. There is no foolproof means of converting existing media in AC3 format to AC4, this includes DVDs, Blu-Rays, and file recordings, unfortunately, without remastering using the latest software supporting the AC4 output format and using the original multitrack audio recordings. The industry will be slow to switch to AC4 specific media for this reason. The present system technology supports automatic conversion of AC3 stereo source, AC3 multi-channel source, all the way through to DVD/Blu-Ray source, into a compatible AC4 codec format implicitly, by introducing a "dialog channel".

BRIEF DESCRIPTION OF THE DRAWINGS

Generally, like reference numerals in the various figures are utilized to designate like components.

FIG. 3 is a functional flow diagram of transmit side pre-distortion training for the two to six channel embodiments of the present disclosure.

FIG. 4 is a functional flow diagram of transmit side speech enhancement for the two to six channel embodiment of the present disclosure.

DETAILED DESCRIPTION

Figure 1:
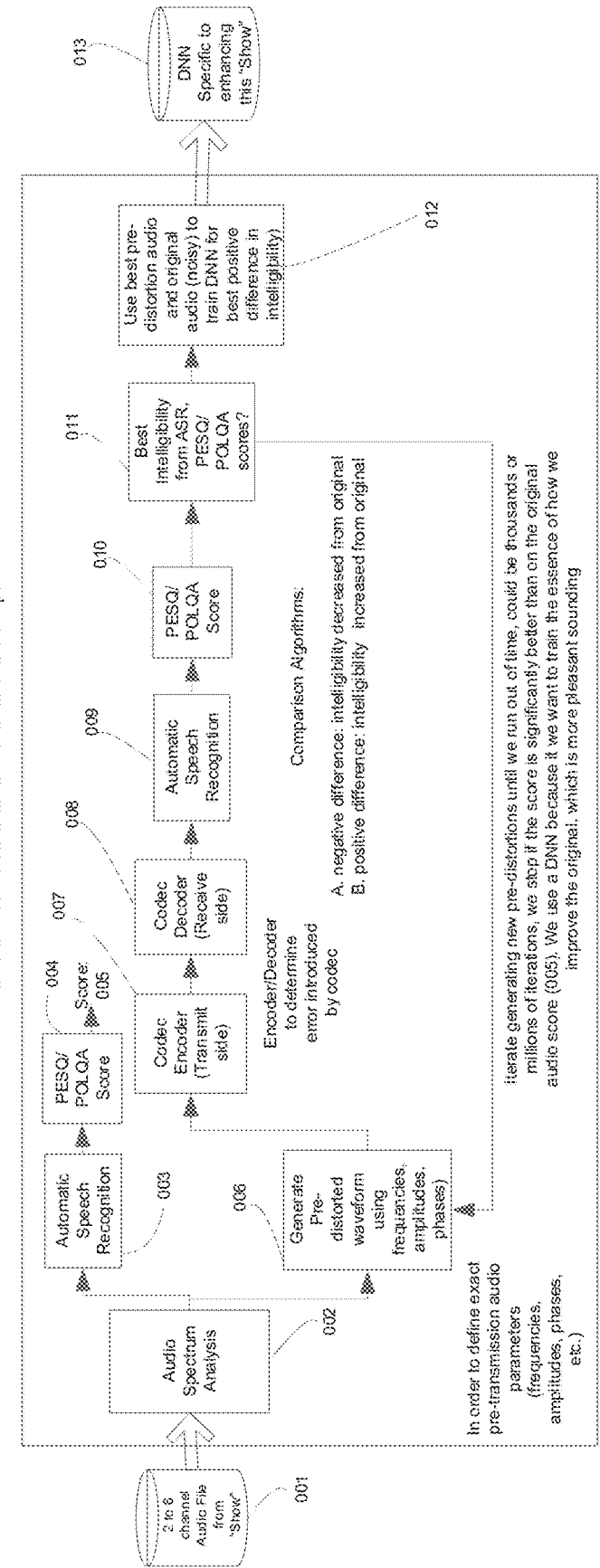
FIG. 1 is a functional flow diagram of a transmit side basic pre-distortion concept according to an embodiment of the present disclosure.

Perceptual codecs introduce noise which impacts hearing impaired individuals by reducing speech intelligibility in modern TV shows and movie digital streaming media. Higher compression rates often make the speech intelligibility issue worse. High dynamic range in media further compounds speech intelligibility issues by effectively reducing 16-bit samples to 8-bits or even as small as 4-bit sample resolution, which further taxes speech intelligibility. As many as 50% of viewers have experienced less than favorable speech intelligibility in some shows and scenes, and turn on close captioning or continuously adjust the volume. In 5.1 systems (which have 6 channels), the dialog track is currently often accompanied with music and sound effects mixed in. In stereo broadcasts, there is no dialog track, and dialog is accompanied by music and sound effects mixed in, often at power levels exceeding the dialog. Modern TVs have inferior sound reproduction due to reduced internal cavity volume, which is a physical acoustics limitation, and often have speakers facing other than the listener, producing complex multipath into a reverberant field, with no direct path to the listener. Multipath further reduces speech intelligibility by introducing phase noise and additional glottal impulses into what we hear, with different time delays, which further confuses human perception and speech intelligibility, it makes speech sound muddled and less clear.

Accordingly, embodiments of the present invention relate to a system and process for pre-distorting TV shows and/or movie media such that digital transmission of the media via current MPEG4/AC3 (or AAC) or MPEG4/AC4 codec for broadcast or streaming over the Internet, has enhanced speech intelligibility. The application applies to any perceptual codec used for said purpose of transmission. The modern TV show and movies often have large dynamic range, have audio mixed for 3D surround effects, high dynamic range action scenes, quiet and loud passages, music background, and increasingly are less intelligible to the average listener, and especially so to the hearing impaired. A real-time or non-real-time processing of the entire media file using pre-distortion techniques, and special algorithms including neural network (NN) models (which includes DNN, RNN, CNN, and similar NN models supported by the current state-of-the-art in trainable neural nets), trained on perceptual codec induced noise, quantization noise, dynamic power level adjustment, frequency response adjustment, pitch and glottal impulse response adjustment, and other techniques, is performed. The pre-distortion process is iterative, all combination of pre-distortions to combat perceptual codec noise are attempted, and the result scored by automatic highest score utilizing an automatic speech recognition engine, the best speech recognition results and highest automated intelligibility scores are considered to indicate the best pre-distortion to be applied. Once the best pre-distortion is applied, a single media file is then encoded for transmission using the MPEG4/AC3 or MPEG4/AC4 (or broadcast/ transmitter preferred codec) at compression rate desired.

The TV show/movie enhancement non-real-time processing of the entire file using pre-distortion techniques, and DNN trained on quantization noise, designated QuantizationNoise DNN, and another DNN that is trained from the best pre-distorted file which scores the best using an Automatic Speech Recognition (ASR) can be utilized in embodiments. This provides a machine-controlled non-human evaluation of the speech intelligibility enhancement and selection of which output file has the most speech intelligibility, which is critical to this whole process. The algorithm performs media modification at the transmit side (at the distributor) so that the transmitted media stream has improved speech intelligibility. This does not require a modified MPEG4-AAC (AC3 or AC4 format) codec, but would also support the newer MPEG4/AC4 codec used in the upcoming ATSC3 broadcast TV (not yet on cable) with the separate dialog channel. This feature, that older MPEG4/ AC3 systems will continue to operate as before without modifications, and that it provides a simple means of creating MPEG4/AC4 recordings with the enhanced dialog channel will be the desired by transmitters and media streaming distributors. The exact method of pre-distorting will change over time, and we are not constrained to use just one specific method, but the process of creating pre-distorted files, using a specific perceptual codec in forward and reverse fashion, comparing the output to see minimized error, and testing using various machine automatable metrics, is the critical concept.

The processing in the pre-distortion technique of embodiments can take advantage of being able to process the entire media file at once, unlike any other approach in the industry. The processing could be performed in chunks as small as a few minutes, but with a slight performance reduction, compared to using the entire media file. The advantage of this non-real-time processing approach is that amplitude related adjustments, such as quiet scenes vs. loud scenes within the show, can be optimally equalized. This sound level equalization is critical to both the maximum speech intelligibility recovery, and to the ADC quantization noise minimization, and minimizes the perceptual codec from introducing distortions later on, when the PCM data is re-encoded using the AAC codec. So, in the case of quiet scenes, the only control that sound engineers originally had was to reduce the amplitude of the speech, consequently, even if the 16-bit PCM audio recording started out as full range, it might get attenuated to 4 bits of amplitude in the final production release. At this level of quantization, the speech quality is slightly degraded, and speech intelligibility is degraded as quantization noise is increased, with a form of phase distortion. The first recourse is to apply a specially trained NN (generally a DNN model, but also applies to an RNN, CNN, etc., any sort of NN model implementation) to reduce the effects of quantization noise on speech, but to apply it, we need to disassemble all the tracks and get back to just the dialog track. In stereo, there is no dialog track, so it must be created by averaging the left and right channel, and the left and right channel then become only what is different between the mono channel and the left or right channels. The new mono channel will have background music, sound effects, etc., in addition to dialog, which is not ideal. Various conventional speech separation and enhancement techniques can be employed to reduce the background music and special effects noises from the speech content. These can be applied in series. The resulting mono recording becomes the dialog channel. In the case of 5.1 (6 tracks), there is a dedicated dialog channel (center channel), but it also typically has background music and sound effects in it. This track can be treated in the same way as the stereo derived track. The quantization noise essentially is an in-band noise that cannot easily be filtered off. A DNN model previously and one time trained at 48 kHz sampling rate, with various levels of ADC 16-bit and 8-bit quantization noise on a vast variety of speech/music/sound effects is used, this being one of the aforementioned DNN models. Using that DNN model attempts to recover the PCM data back to full 16-bit quality as best as possible. This is applied to all the speech portions as a first pass, and the amplitude is also scaled up to reduce quantization noise, essentially the dialog track is remastered at a sample-by-sample level for maximum speech intelligibility, the dynamic range of the resulting dialog will be reduced, so loud yelling will be quieted, and quiet whispering will be loudened. Another form of pre-distortion is to remove the effects of whispering or very quiet speech. A de-whisper algorithm can be applied to non-pitched/voiced portions of the dialog track. Other forms of pre-distortion specifically are to combat the MPEG4-AAC codec. This is where the iterative approach is used, essentially time/frequency/amplitude modifications of the AAC codec are monitored over time, and some of those modifications are compensated for by pre-distorting the dialog to compensate for the perceptual modifications. In this way, we say that the pre-distortions to be tried are informed by the logic of the AAC codec directly. This approach would work for most any sort of perceptual codec algorithm that was accessible (say from source code), or from a detailed log listing over time. Another form of pre-distortion is to make no assumptions about the processing performed by the perceptual codec, and to use a General Adversarial Network (GAN) to generate a large amount of random modifications, similar to what the perceptual codec can perform, but in an uninformed manner, randomly, and then apply the codec, and then perform decoding, and compared the decoded audio to the original waveform. Multiple tests can be used for comparison, one is the magnitude of the sample differences. Another would look at an estimate of the PESQ/POLQA score, and another still is to use an ASR to determine the text quality metric, and the overall best PESQ/POLQA speech intelligibility score, or the overall best text quality metric from the ASR, that file has the best pre-distortion. The file with the best pre-distortion can then be used to form a media file specific DNN model, or could be used directly. Direct application of the pre-distorted file may not sound as good as one generated by applying the DNN model to the original dialog audio track. Once this processing is performed, the dialog track, background tracks, and any close captioning (CC) or meta data tracks, along with video track, can be reassembled back into a media file in MPEG4/AC3 or MPEG4/AC4 format, or both, and distributed.

Basically, whatever method is used to pre-distort, it creates a whole bunch of test waveforms, and embodiments compare each against the original. If the differences are not too great, and it has a high PESQ/POLQA score (automated metrics for measuring intelligibility), it is submitted to be automatically recognized. The pre-distortion with the best PESQ and or POLQA score(s), and cleanest (least garbled, most recognizable words which is a metric from the automatic speech recognition), is the best pre-distorter. So, in true machine learning fashion, in lieu of having a human qualify each generated media file, a combination of metrics is used to perform this difficult task of finding the best enhancement. So, pre-distorted files are subjected to the perceptual codec desired (say MPEG4/AC3), then decoded, and the result is submitted to the PESQ/POLQA evaluation and the automated speech recognition (ASR). The best scoring result is then the optimal pre-distortion for a given TV show/movie media recording. This is performed on a per show, or per movie basis, so the optimal results for one episode of one show do not necessarily apply to the next episode of the same show. By definition, it can be found, and there will be a best scoring result. If there is a close captioning (CC) track available, which there mostly would be, then a comparison of which ASR generated text most closely matches the CC text can be performed, and the one with the best score is the winner. Essentially, waveform is pre-distorted prior to the codec to produce the best possible most speech intelligible result and proved it using automated means. It is in accordance with ASR though, not human perception, but it is an automatable metric at least, but is not 100% guaranteed to be the most human intelligible speech, which is so far, unachievable without a human in the loop evaluating each pre-distorted recording.

Within a smart TV, there are apps for the services (channels if you will), but even these apps cannot always be upgraded, for a given age of TV or playback device, it is up to the service provider, and up to the TV or playback device vendor whether that device can have its codec updated. In the app industry for smart phones/tablets, apps can be updated easily. In the TV manufacturing space, TV apps for smart TVs can be updated (by the TV manufacturer and user notified there is an update), relatively frequently. Once the TV is a few to 10 years old, you no longer be able to update those apps, the device then becomes protocol-locked.

Most speech processing (such as recognition) is performed in the spectral domain, which typically is magnitude only (phase is not considered), so various processing stages used in many special effects tend to ignore phase impact, so long as the magnitude spectrum does not introduce noise artifacts. For this reason, when phase is ignored or not preserved, and these spectral processing techniques are applied, the net result when converting the audio back into the time domain is the introduction of perceivable phase distortion. This type of noise is more likely to be perceived by the hearing impaired listener than the unimpaired listener, although the track(s) will likely be less intelligible, and less listenable in general. Spectral processing and magnitude preservation may be fine for speech recognition (the vast bulk of which is trained against magnitude spectral data in the first place), but terrible for human speech intelligibility.

What is interesting with all this perception stuff is, the current AI automatic speech recognition (ASR) algorithms do not perceive like us, they just process the waveforms, but generally they do this in the magnitude spectrum sense, ignoring the subtleties that mess up our hearing, which is very sensitive to impulses, such as produced by the glottis (glottal impulses), which are the basis of all vowel sounds. Some of the files that the AI automatic speech recognition algorithms do poorly on, we can hear fine; others they do great on and we cannot make out 50% of the words. We assume this is largely due to the ASR not really taking into account phase noise or phase distortion. Likewise, the ASR algorithm's ability to deal with noise in the background, such as machine noise, white noise, etc., is poor, whereas ours is good (forensic speech folks prefer to use unmodified sound recordings for instance, rather than speech enhanced versions of recordings).

A present invention embodiment that pertains to a transmit side (before transmission media such as cable, TV broadcast, internet distribution), and applies pre-distortion before the codec, and before transmission, is illustrated in FIG. 1. The audio file with 1 or more channels is the input (typically stereo to 6 channels) (001), which must be encoded in a PCM sampled audio format or converted to that format. The audio is analyzed using audio spectrum analyzer (for each channel present) (002). This analysis allows us to define the exact pre-transmission audio parameters (frequencies, amplitudes, phases, etc. that comprise the audio signal). Next, the audio is analyzed by an automatic speech recognition (ASR) algorithm (exact choice is not that relevant, but it must include scoring measurements) (003). This establishes a baseline for the speech quality, making the assumption that the ASR will produce a better transcription the more intelligible the speech is to a person. Next, a PESQ/POLQA scoring algorithm establishes a metric for the original recording (004), which has a score (005). Any improvement through the process must result in a higher score than this original score. The audio channels are then pre-distorted using the frequencies, amplitudes, phases, etc., of the audio spectrum analysis (006). This begins an iterative loop whereby many (thousands to millions) of iterations are created, each subtly pre-distorted from the other. Next, the audio channels are entered into a specific codec encoder which represents the Transmit side encoding (007). The specific codec is not that relevant, but generally this would be the currently most common MPEG4/AAC (AC3 or AC4) codec. Next, the encoded output is then decoded using the same Codec's decoder (008), which converts the digitally encoded audio channels back into a PCM sampled waveform. This would be the audio received on the receive side, such as on a viewer's tablet, TV, set top box, smart phone, etc. The audio is then submitted to the same ASR again (009), which provides an intelligibility metric, of the number of recognized words, their recognition quality, and the audio is also scored (again) using a PESQ/POLQA intelligibility scoring algorithm (010), which results in a score. The two scores are compared to find the best intelligibility score so far (011), and if a sufficiently "best" score is not found yet, the process is repeated starting at 006, until all possible pre-distortions are tried, or we run out of time. Once there is no more time, the best scoring pre-distortion is used to pre-distort the audio channels, and a DNN is trained against the original audio (considered noisy), and the pre-distorted audio (considered clean), and the DNN then learns using all the samples (and channels) in the show to transform noisy into clean. This is then applied to the original audio to produce an intelligibility enhanced version of the audio channels that can be used to replace the original audio. This represents a basic concept of how the pre-distortion loop works to produce the best possible speech intelligibility enhancement. The other figures are additional embodiments developing further how the pre-distortion approach can work.

Figure 2:
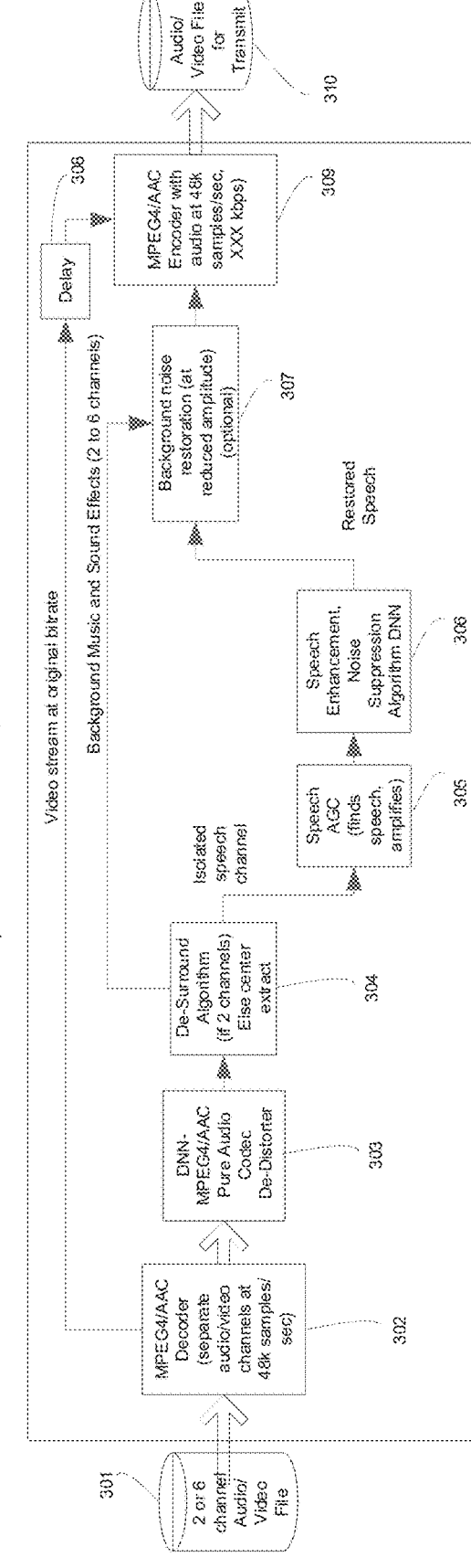
FIG. 2 is a functional flow diagram of transmit side speech enhancement for a two to six channel embodiment of the present disclosure.

A Transmit Side Speech Enhancement embodiment is a specific instance of the general idea of FIG. 1, and is shown in FIG. 2, where 2 to 6 channels (or more) (301) are input from a media file, the processing algorithm outputs a modified media file with enhanced speech. The first step is that the MPEG4/AAC (AC3 or AC4 or other codec) media is separated into audio and video and close captioning tracks (and any other meta data). The next stage is the application of a DNN pre-trained for MPEG4/AAC codec distortions (303), which performs the function of De-Distorting the audio back to a Pure Audio format, for each channel, with primary interest on the Dialog channel. In the case of stereo input only, the background is converted into a left and right channel, and a Dialog channel is created. In (304), de-surround processing is performed and the isolated speech/dialog channel is sent to the (305) which performs Automatic Gain Control (AGC) on the entire audio recording and finds all the sections with speech. Speech Enhancement (306) is performed on all the speech portions, including dynamic range adjustment, and processing with a DNN designed to reduce ADC quantization noise (for quieter sections). The background music and sound effects channels, and the enhanced dialog channel, are then input into the Background noise restoration (307), which basically puts the dialog track about 15 dB louder than the background tracks. The delayed video (308) is then combined (309) with the audio tracks, close captioning, and any meta data, back into an MPEG4/AC3 (or AC4 or both) media file(s), suitable for transmit (310). If the input file is stereo (2 channels), a total of 3 channels will be output, with a left and right background, and a dedicated dialog channel, otherwise the channel count will be the same. This processing is suitable for broadcasters (cable or streaming on demand, etc.), being performed prior to transmission.

The Transmit Side Pre-Distortion Training of an embodiment shown in FIG. 3 shows for a 2 to 6 channel (or more) media file (101), the processing algorithm accepts stereo to 6 (or more) channel input media file "show", and it outputs trained DNN specific for enhancing that specific "show" (113).

This MPEG4/AAC decoder is used to separate the audio and video (and close captioning CC tracks and any meta data) (102), these are then sent to a file of Clean Audio (103). A special GAN (or other pre-distortion algorithm, such as SEGAN, WSEGAN, HiFi GAN2, etc.) (104) is used to create N Distorted Audio files (105), which could be 100's of 1000's of separate files. These are MPEG4/AAC encoded (106) (or whatever perceptual codec is to be used, the concept does not care which type of codec is used in this scheme). The next step is to then decode the encoded waveform using MPEG4/AAC decoder (107) (or whatever analogous decoder is required to undo (106) codec. The decoded speech track is then ordinary raw PCM audio format and is subtracted from the Clean Audio (108), the result if the files are identical is 0. If the files are slightly different, there is an error produced (109). If the error is very large, that is a failure, and will be ignored. The speech track will then be assessed automatically for PESQ and POLQA speech intelligibility (an automated metric) (110), and if a positive change over the original Clean Audio, an Automatic Speech Recognition (111) will be performed, the purpose of this step is to examine quantitatively the automatically extracted text (and its quality), and compare it against the CC (if available). ASR text more closely resembling the CC (if available), or with highest transcription score (least ASR error), will be considered the most favorably pre-distorted speech (112), which is the goal of all the pre-distortion processing. The DNN/GAN and any other data will be written into the DNN specific to this Show file (the training data) (113). This file is the input into FIG. 4 which is used to optimize and re-create the most intelligible speech for the show/movie.

The Transmit Side Speech Enhancement embodiment in FIG. 4 uses the DNN training input file (202) developed in the processing in FIG. 3, and the 2 to 6 channels (or more) MPEG4/AAC audio/video file (201) input. The data is MPEG4/AAC decoded into separate audio and video tracks, and separate Close Captioning (CC) track(s), and meta data. The DNN (204) is then used to execute the DNN model (202) on the dialog track, and possibly other tracks, and results in an enhanced dialog track with pre-distortions applied. It is important to note that the DNN for Specific show model may contain more than just DNN data, it may contain meta data for re-constructing all the processing (such as gain adjustment, ADC quantization noise adjustment), pre-distortions informed by the codec, etc.). Finally the audio tracks are reassembled with the video track (and any meta data or close captioning (CC) track(s)), with video delayed (205) if necessary in the MPEG4/AAC encoder (206), which performs multi-channel perceptual coding on the audio streams and combines the CC, and video streams (and any meta data) back into a single Audio/Video file (207) in MPEG4/AAC (or other perceptual codec if desired) format. Since the speech track was enhanced for improved speech intelligibility, and the background/music tracks suppressed relative to the speech track, the reassembled file will, by definition have a super speech intelligibility, more bits in the perceptual codec will be dedicated to preserving as much speech fidelity (and thus intelligibility) as possible regardless of the final compression rate desired.

Figure 5:
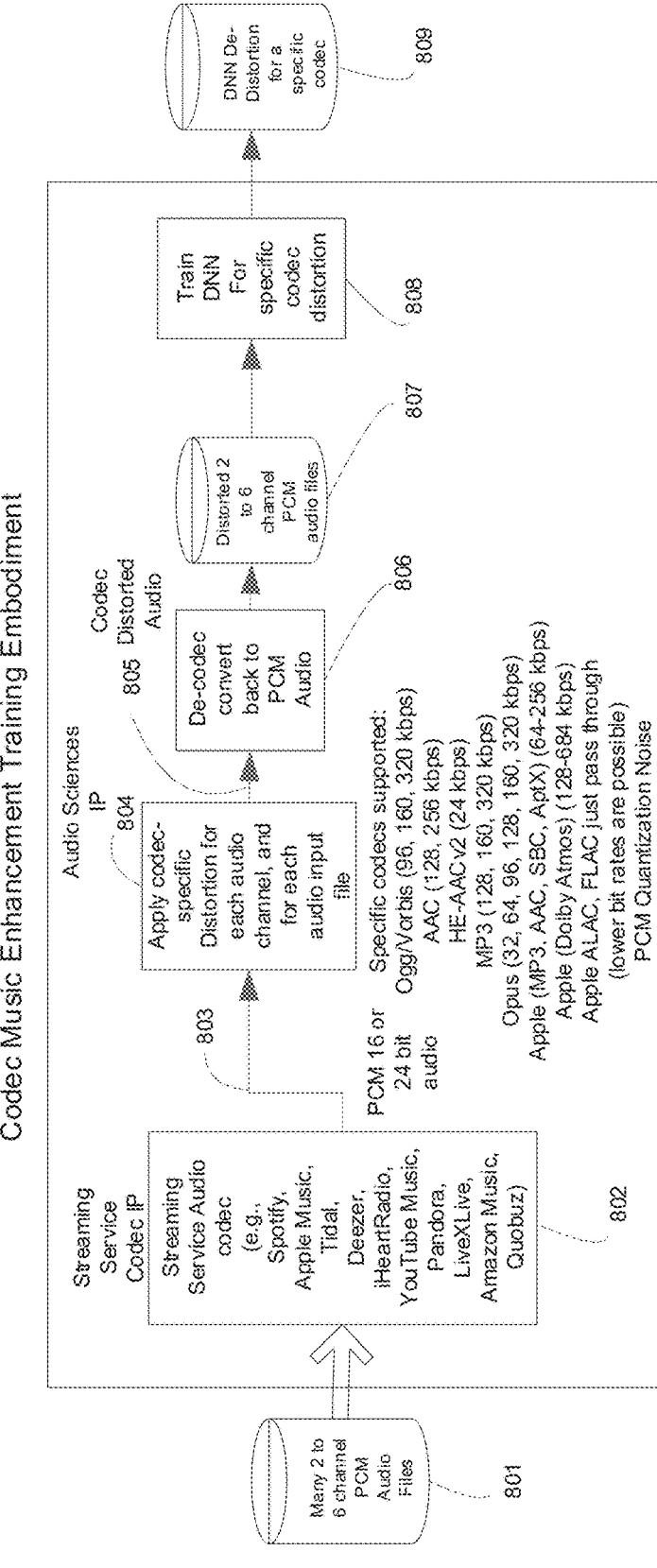
FIG. 5 is a functional flow diagram of transmit side audio/music codec training to produce a DNN which can neutralize effects of the codecs and produce a pre-transmit (DeCodec) DNN model according to an embodiment of the present disclosure.

In FIG. 5, shows how a training system embodiment trains the DNNs for each Audio codec. The various output separately trained DNNs are to be embedded into the various pre-transmit embodiment processing chain as previously described. The input is many stereo, or up to 6 or more channels, raw PCM audio recordings (compressed recordings will work if not heavily compressed, but this form of input is sub-optimal), these are considered the "clean" or pristine input (801). The training process includes the streaming service audio codec to be trained against (or digital implementation suitable for execution on the development processor, may be different CPU architecture then the actual final embedded streaming service codec target CPU) (802). These services use the types of audio codecs and rates listed in FIG. 5 (804). This Streaming Service must accept the raw PCM input (801) and number of channels required, and outputs a PCM stream with 16 to 24 bit PCM output (803), generally this step is a pass through. The next step is to use the appropriate possibly vendor specific codec (802) such as those listed and their respective rate(s), to produce codec output (805). Next the codec data is delivered to the codec decoder and is decoded back into the single to multi-channel PCM audio samples (806), which are recorded in a file (807). The single or more likely many such files (from a large collection of disparate music/audio files are then trained, with the original PCM (801) considered the clean source, and the post codec output considered the corrupted noise source (807), the DNN training process thus is capable of learning how to both model and remove the effect of the codec (the distortion) (808). The result is a single trained audio DNN model that, when applied to the specific audio codec output, can remove that distortion in the future against even never before seen audio. A sufficiently large and disparate training set will develop all possible inputs mapping to all possible outputs (in theory), with a set size of 100's to millions of input files being sufficient, such that future source material does not require training to yield the desired distortion reduction effect. The number of inputs being sufficient is directly proportional to the codec's complexity and how frequently all possible codec states are statistically visited. A robust and disparate diverse training set is required that attempts to utilize all possible codec states. Instrumentation of the codec could reveal if all possible codec states are traversed (thus providing proof of sufficient coverage). Essentially the DNN learns all possible codec distortions and how to mitigate them. This is repeated for each codec and ideally for each codec rate, as different codecs will exercise different compression schemes depending on the desired compression rate. In theory, all distortions/corruptions caused by any specific codec could be simultaneously trained so that a single DNN model could represent how to correct any codec, the issue being that the resulting DNN model will take significantly longer to train and most likely would also become much larger, requiring more end-device memory and computational requirements than the codec specific case. As an intermediate simplification still covered by this training embodiment, groups of codecs, either by similarity, such as families of AAC codecs, or by being the same codec but at different compression rates, or any combination thereof, could also be developed. The resulting codec specific DNN models are then used in the other Figures embodiments as input, either embedded/compiled into other post-codec processing, or downloadable. Once trained, these DNN models should be sufficient not to require updates in the future however, given sufficiently large training sets, and are considered converged on the final ultimate form, having statistically captured all possible input permutations and output permutations of each specific codec trained.

Figure 6:
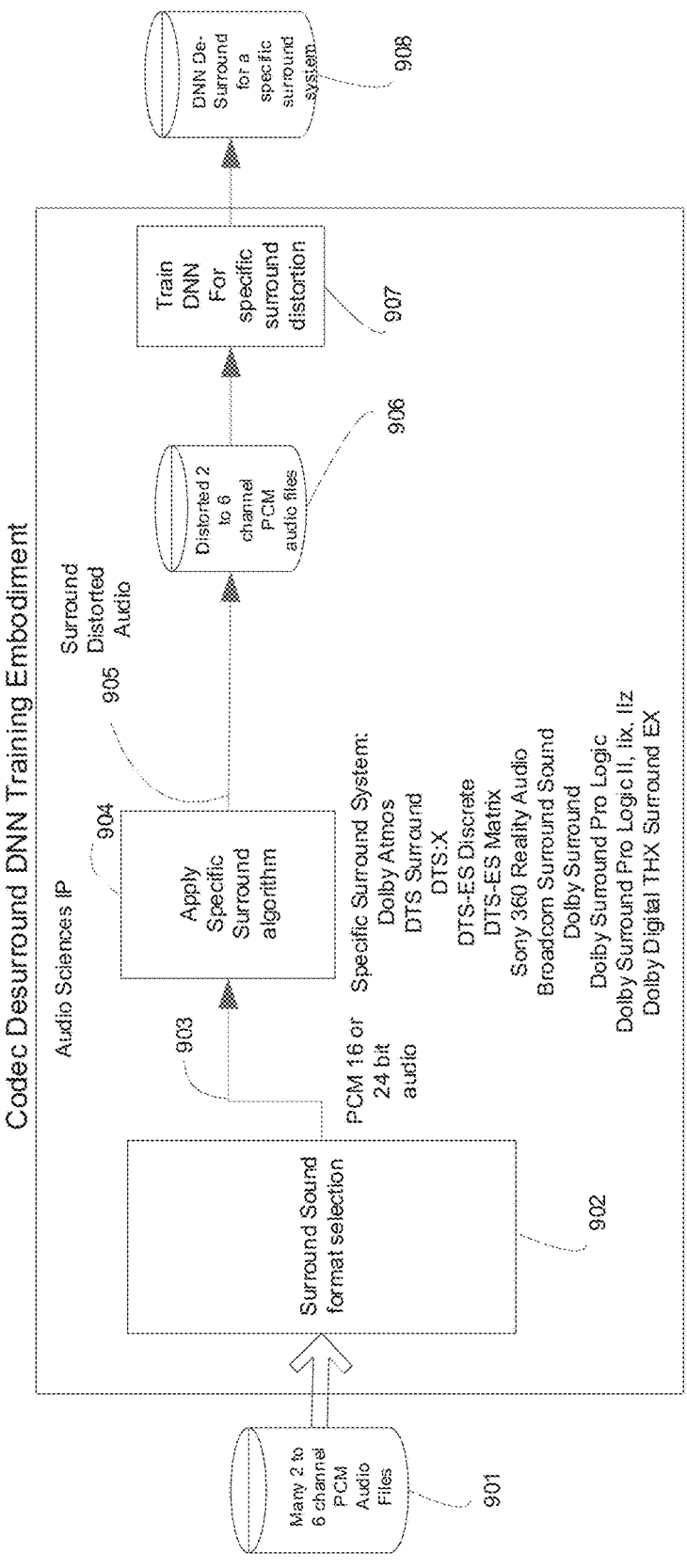
FIG. 6 is a functional flow diagram of transmit side surround training to produce a DNN which can neutralize surround effects of surround sound systems and produce a pre-transmit DNN model (designated DeSurround DNN) according to an embodiment of the present disclosure.

In FIG. 6, this is how a training system embodiment trains the DNN models for each surround system, designated as DeSurround DNN, shown in the list below 904. This is similar in structure to the diagram of FIG. 5, but instead of training against specific Audio/Music codecs, we are training against specific surround systems as a source of distortion. The surround systems output an analog set of channels encoded in raw PCM format, in general. In some systems, information about how sound channels are mixed requires application of external meta-data, which this embodiment does not show. In those cases, a specific set of surround input files (with surround effect already imposed), and original audio recordings (before surround effect is imposed), must be provided. The development of the de-surround DNN model purpose is to essentially alter the surround effect primarily for stereo (dual) channel recordings. The use of additional channels in the output is non-essential for the stereo de-surround DNN utility. This de-surround DNN model can be used in the transmit side processing or in the receive side processing. The basic flow is input (901), choose surround sound format (902), which is generally a pass through (903), then apply the specific surround sound format from the list (904), which results in 2 to 9 channels, the most important of which are the stereo Left/Right channels (905). The surround channels are written out (906), and the DNN is trained, with the input being the original clean audio channels (901), and the noisy corrupted channels being (906). The DNN model is then learns how to map surround channels back to the original channels when being trained against a very large dataset for that specific surround technique. In theory, multiple surround techniques could be trained into a single De-Surround DNN model, but the amount of training data at a single training time would be much greater, and the resulting DNN model would be more complex than training against only a specific surround system. For the purpose of applying the de-surround DNN in a speech intelligibility/enhancement embodiment in general, there are some fairly simple algorithms for determining which surround system is in use. One technique would be capturing a single buffer, apply each de-surround DNN to that buffer, the buffer emerging with the most reduced "complexity"—as measured by the largest reduction in phase differences between Left and Right channels, or smallest coherence difference between left and right channels, is the likely surround system. This would in general discriminate between the Broadcom Surround system (which is a spectral band coherence application system), and Dolby Surround systems, and DTS Surround systems, and Sony surround systems (4 largest separate major techniques.) Another method is to develop features, such as coherence in spectral bands, to distinguish between the types of surround system being applied. Determination of the surround system used in a multi-channel system is not an easy problem, unfortunately, as typically meta-data embedded into a 5.1, 7.1, or even 2.0 or 2.1 stream, does not identify the type of surround (if any) applied, so this analog feature-based classification approach must be applied, otherwise it is not clear which De-Surround DNN model to apply in an embodiment.

Figure 7:
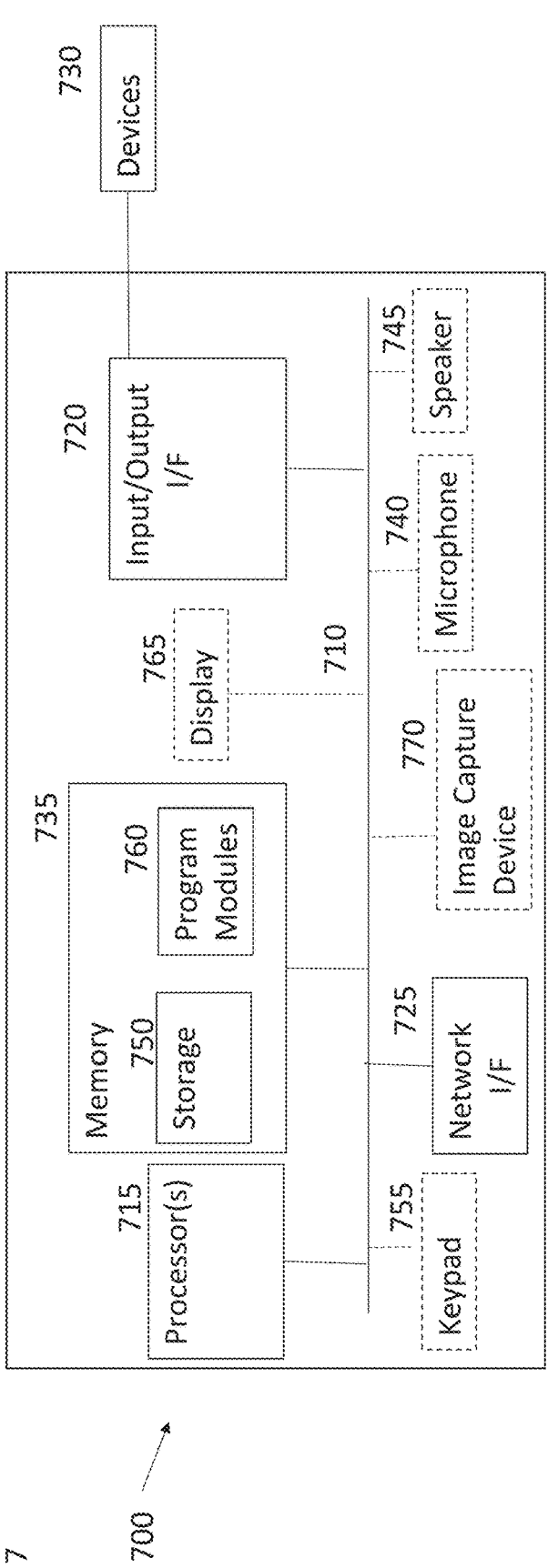
FIG. 7 is a block diagram of an example computing device according to an embodiment of the present disclosure.

An example of a computing device 700 (e.g., implementing various processing devices of present invention embodiments) is illustrated in FIG. 7. The example computing device may perform the functions of present invention embodiments described herein. Computing device 700 may be implemented by any personal or other type of computer or processing system (e.g., desktop, laptop, hand-held device, smartphone or other mobile device, etc.), and may be used for any computing environments (e.g., cloud computing, client-server, network computing, mainframe, standalone systems, etc.).

Computing device 700 may include one or more processors 715 (e.g., microprocessor, controller, central processing unit (CPU), etc.), network interface 725, memory 735, a bus 710, and an Input/Output interface 720. Bus 710 couples these components for communication, and may be of any type of bus structure, including a memory bus or memory controller, a peripheral bus, and a processor or local bus using any of a variety of conventional or other bus architectures. Memory 735 is coupled to bus 710 and typically includes computer readable media including volatile media (e.g., random access memory (RAM), cache memory, etc.), non-volatile media, removable media, and/or non-removable media. For example, memory 735 may include storage 750 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 710 via one or more data interfaces.

Moreover, memory 735 includes a set of program modules 760 that are configured to perform functions of present invention embodiments described herein. The memory may further include an operating system, at least one application and/or other modules, and corresponding data. These may provide an implementation of a networking environment.

Input/Output interface 720 is coupled to bus 710 and communicates with one or more peripheral or external devices 730 (e.g., a keyboard, mouse or other pointing device, a display, sensing devices, etc.), at least one device that enables a user to interact with computing device 700, and/or any device (e.g., network card, modem, etc.) that enables computing device 700 to communicate with one or more other computing devices. Computing device 700 may communicate with one or more networks (e.g., a local area network (LAN), a wide area network (WAN), a public network (e.g., the Internet), etc.) via network interface 725 coupled to bus 710.

With respect to certain entities, computing device 700 may further include, or be coupled to, a touch screen or other display 765, a camera or other image capture device 770, a microphone or other sound sensing device 740, a speaker 745 to convey sound, and/or a keypad or keyboard 755 to enter information (e.g., alphanumeric information, etc.). These items may be coupled to bus 710 or Input/Output interface 720 to transfer data with other elements of computing device 700.

It is to be understood that the software of the present invention embodiments (e.g., program modules 760, etc.) may be implemented in any desired computer language and could be developed by one of ordinary skill in the computer arts based on the functional descriptions contained in the specification and flowcharts illustrated in the drawings.

Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various transmitting and receiving devices, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., program modules 760, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of present invention embodiments described herein.

In an embodiment, a method, comprises separation of digital media into its constituent parts, namely audio tracks, video tracks, close captioning (CC) and/or meta data, etc. Processing the audio using a plethora of techniques designed to reduce background noise, separate speech/dialog from background noise, sound effects and music, and produce an equalized single mono audio track with predominantly just speech, normalized in power (such that quiet parts are loudened, and loud parts are quieted). Using algorithmic and DNN trained model techniques to improve speech intelligibility prior to then encoding using a perceptual codec, such as MPEG4/AAC (AC3 or AC4 for instance) into discrete audio tracks, then recombining the audio, video, CC, and any meta data tracks back into a digital media prior to transmission, in a real-time or non-real-time manner. Any such reassembly may require either the audio tracks be re-aligned by removing any incurred delay, or the video track delayed, so that the reassembled media comes out properly time aligned, and visual events/cues are aligned in time with audio events and cues.

In an embodiment, perceptual codec's, such as MPEG4/AAC (AC3, AC4 or similar perceptual codecs) perform modifications involving waveform modifications, time segment replication, time segment removal, frequency domain modifications, amplitude modifications, spectral equalizations, etc., all of which can actually be determined by running the codec over the entire dialog track file in PCM format and noting the types of modifications (and at which times) these modifications are made. Depending on which perceptual codec is involved, types of modification can be observed by the net result in the decoded codec output audio PCM file, compared with the original PCM waveform, or by instrumentation in the codec to log the state changes it is making vs. time. Once noted, pre-distortions can be applied to reduce or mitigate the effect of these modifications, in the form of pre-distortion modifications. This is a form of pre-emptive modification of the source audio before the codec introduces the distortion in the first place. This type of pre-distortion does not require DNN training as there is a direct mapping between the distortion to be mitigated and the pre-distortion to apply, but it does require extensive understanding, and perhaps control of the codec at the source code level.

In an embodiment, it is possible to modify the perceptual codec such the most egregious changes (which are responsible for some of the most significant speech intelligibility reductions/losses, can be eliminated. In some codecs, there are feature control switches at a high level, in others, source code (which is sometimes available) modification of the codec is required. Use of switches or modification of the source code in this way does not affect the codec output protocol, so the resulting digital stream will still be able to be decoded by an unmodified codec, so the output waveform is still encoded in MPEG4/AAC (AC3 or AC4) format, but it may not compress as efficiently, but speech intelligibility will be minimally impaired.

In an embodiment, in the case where no knowledge of the perceptual codec is used, an iterative method that tries all possible short-term pre-distortions over the duration of the media file can be employed. These pre-distortions can generally be informed by the general content at a given point in time, for instance, loud, or quiet, and pitched/voiced or not. This iterative approach is essentially blind equalization, and many examples of possible pre-distortions will be formed. The pre-distorted versions will be trained to form a DNN model, which will then be applied to enhancing the original audio, which will sound more natural than a simple digital gain adjustment algorithm would.

In an embodiment, in the case where no knowledge of the perceptual codec is used (or required, or is unavailable), a method of generating a plethora of Pre-codec files from the original Pre-codec dialog track, using a Generative Adversarial Network (GAN) or other random pre-distortion algorithm is used to create the additive pre-distortions. The plethora of test files is then processed through the codec, thus are post-codec, and are iteratively compared in a feedback loop against the Original Pre-codec audio file, until the post-codec file which "looks as close as possible" to the Original Pre-codec audio file is found.

In an embodiment, one form of "looks as close as possible" test can be defined as the difference in pre-codec file samples vs. the post-codec pre-distorted file samples, the magnitude of the difference which is smallest is considered the least distorted. This basically just means that, because of the pre-distortions, the codec output looks very similar to the new input, so distortion introduced by the codec has been minimized.

In an embodiment, a test can be the original pre-codec PESQ or POLQA score, vs. the final post-codec pre-distorted file PESQ or POLQA score, the output with the largest PESQ/POLQA score is considered to have the best speech intelligibility.

In an embodiment, a test can be the original pre-codec file processed with Automatic Speech Recognition (ASR) audio to text conversion vs. the ASR audio to text conversion of each pre-distorted example files, the pre-distorted example file with the either the best match word count to the CC, or highest word count and accumulated quality metric, regardless of CC, is considered to have the best speech intelligibility.

Any of the above tests individually or in combination can be used as a test/scoring method.

In an embodiment, a Generative Adversarial Network (GAN) method can be used to perform random pre-distortions, generally these pre-distortions must be barely audible so as not to introduce perceptible artifacts, and the final best scoring audio can be used directly as a replacement track, or as training for a DNN model developed that is trained on the differences over the full length of the media file. This resulting DNN model can be later applied to the same original media file, for a smoother output. This process will be very compute intensive, but generally faster than a day on a modern PC.

In an embodiment, a method of enhancing speech track where the dynamic range is adjusted and the quantization noise is removed using a DeQuantization Noise, DeCodec, or DeSurround DNN models, in whole or in part, or even combined into a single model. In this case, this is a pre-processing step which can be used in conjunction or prior to other pre-distortion steps. This method combats the effect when speech that is very quiet in the original recording (having under 8 bits, and often as little as 4 bits) suffers from quantization noise effects. To combat this, the DNN is applied over these portions, specifically the DeQuantization Noise DNN for quantization noise specifically was trained to detect and remove quantization noise replacing it with best possible smoothed waveform. This has been observed to reduce in-band noise, especially phase noise, in these quiet quantized portions of the speech. After applying just this pre-distortion, a dynamic range reduced multitrack recording with the speech/dialog channel separated from other channels will be developed. In the case of a mono soundtrack, there will be just the new mono track. In the case of a stereo soundtrack, there will be a mono dialog track, and a stereo (2 channels) background. In the case of 5.1 (6 channels), the dynamic range of the 5 background channels will be reduced (flattened), and the dialog channel will be enhanced. The resulting dialog channel after this operation will no longer have very quiet dialog passages, so many more bits of the standard 16-bit PCM waveform will be used for speech. When the perceptual codec is then applied, the dialog appears louder relative to the background tracks, so more codec emphasis (and thus quality) for a given bits-per-second (bps) rate will better preserve the speech intelligibility, in almost all cases of perceptual codecs in general. This accomplishes two separate goals, quiet passages are speech-enhanced and made clearer, and louder, and loud passages (be they speech or mostly music, sound effects) will be made much quieter. It is effectively similar to the "Night time mode" applied to the entire media file before transmission.

In embodiments, the pre-distortion methods described above enable whatever perceptual codec to be used will have maximally enhanced speech dialog track to begin with, so resulting codec output will have maximum fidelity, whether it is for MPEG4/AC3 or MPEG4/AC4 output, or some other perceptual codec yet conceived or selected by the media distributor. When re-assembling the media recording from the audio, video and Close-Captioning tracks, the output will likely be MPEG4/AC3 and AC4, or both, depending on what the media distributor wants. For broadcast ATSC3 TVs, which use the MPEG4/AC4 codec, the advantage is that the dialog track when received at the TV can be operator adjusted independently of the other audio tracks.

In an embodiment, the pre-distortion perceptual codec enables a MPEG4/AC3 (or earlier generation codec) recording to be converted into a compliant MPEG4/AC4 recording with dedicated dialog channel without requiring access to the original multitrack audio recordings and having a sound engineer manually remix the new dialog channel, instead the enhanced dialog channel can be recreated from mono, stereo (2.0), 5.1 to 7.1 recordings already available to the distributor. This is a primary discriminator and advantage of this technique; it enables original high quality multi-track recordings to be converted directly into high quality multi-track recordings with the enhanced audio dialog track added for MPEG4/AC4 transmission.

In an embodiment, ADC quantization noise imposed on speech, music, background/sound effects, and background noise, etc., can be, given a very large training set, against a less quantized audio data set, removed or effects minimized, and a DNN model can be developed that lessens the effect of the quantization noise. The quantization noise is generally coherent with, lies under the source signal spectrally, and is thus difficult to remove. The DNN model so developed learns the negative effects of the quantization noise and can essentially smooth over and enhance the audio to minimize the quantization effect. The resulting audio is re-quantized to a higher resolution so as to not re-introduce quantization noise distortion, prior to mixing. Further, the ADC quantization noise effect is introduced into recordings whenever the audio level drops, in dialog this happens when the microphone is further away from the speakers (and the audio becomes quieter), or when the speakers whisper, or in a TV show, when the surrounding action sounds are mixed louder than the dialog. In these examples, and many other cases, the effective ADC range of the audio for speech dialog, for instance, may be reduced from 16-bits to 3 or 4 bits, which introduces quantization noise in the audio waveform in the first place. Resulting audio processed through the DNN for De-quantization noise restores audio to 32-bit floating point format as best as possible.

In an embodiment, a specific codec for speech or music audio source, be it a single or multichannel recording, can be applied, and the codec output decoded, into an analog waveform (or raw PCM formatted digital waveform, considered equivalent), and compared with the original waveform, the difference being the resulting distortion introduced by the codec, that this can be trained in a DNN to effectively minimize or remove the effect of this codec distortion, thereby creating a DNN model which can be applied in a playback embodiment in a smart phone, PDA, tablet, laptop, etc., ("playback device"), to improve audio quality on the receive side. The DNN model can also be applied on source audio prior to transmit side, and by so doing, enhance pre-recorded pre-transmit audio prior to additional transmit processing.

In an embodiment, a specific surround sound system can be used to encode stereo (or more channels), and a DNN can be used to train against original pre-surround channels, against the resulting surround channels, and that the difference between the input and output surround channels represents the surround distortion, and this distortion can be eliminated or reduced, thereby effectively restoring audio quality back to the original, at the expense of imposed surround effect, such as the spatial localization of specific sounds, however encoded spatially across 2 or more channels. The DNN can be developed with maximum enhancement performance against a single surround system. The surround system can be statistically identified by various surround sound system features, designed to uncover how the spatial surround information is encoded, at least sufficient to identify between Dolby Surround, DTS Surround, Sony Surround, and Broadcom Surround systems, a minimum of 4 types. Further, for the purposes of speech enhancement/intelligibility improvement, only stereo de-surround enhancement may be required. Since the DNN model is generally imperfect, any improvement will not be 100% restoration, but should enhance the quality slightly when applied to a pre-transmit embodiment.

In an embodiment, the de-surround DNN models, de-quantization DNN models, and de-codec DNN models can be developed to cover the combination of ADC quantization noise, can be applied generally in reverse order, first de-quantization, then de-codec, then de-surround, but by their nature may be able to applied in any particular order, and still have some positive effects on sound enhancement and/or speech intelligibility enhancement.

In an embodiment, the de-surround, de-codec, and de-quantization DNN models can be applied, singularly or in succession, to a lesser or greater extent, in any order, in a playback device in the embodiments. Although a logical order typically would be to reduce ADC/quantization noise first, the subsequent DNN application order is more flexible.

In an embodiment any enhanced or derived channels from performing de-quantization DNN model, from performing de-codec DNN model, or from performing de-surround model can create both the original channels, plus additional enhanced channels, and that such a playback embodiment can utilize these channels either by using the original channels, at reduced level relative to dialog channel, by adding a dialog channel, perhaps at a higher amplitude level, or passing through enhanced channels and discarding original channels, in any combination singularly or multiply, to produce new output channels in a playback embodiment. The dialog channels, when isolated above music or background channels by 10 to 20 dB or more, will enable re-encoding with a perceptual codec with enhanced speech intelligibility, since the speech itself has been artificially raised in volume relative to the background channels, and that further, modern perceptual codecs will then preserve the speech better than the original channels for the same codec. This is achieved by equalizing the various channels such that the dialog only channel is louder than the stereo and background channels, such that on those codec systems where there is no specific preserved dialog-only channel, the dialog is emphasized always at least 10 dB above the background. This eliminates the need to constantly adjust receive-side volume control to hear the dialog.

In an embodiment, by applying the DNN models, it may be possible to introduce additional compression in a codec without reduction of listenability or sound quality, or speech intelligibility, depending on the embodiment's application or goal, thereby enabling a reduction in overall Internet bandwidth for streaming media (audio+video), or streaming audio (audio only) applications. This reduction in bandwidth means additional stream density for service providers, or additional end users for a given bandwidth capacity, and reduced bandwidth consumption for consumers. There is potentially additional compute (and thus generally power consumption) required for the end user to achieve this benefit. Such enhancement could be a factor of 2× or more, depending on the codec artifacts/noise resulting from bandwidth reduction.

In an embodiment, the close captioning (CC) meta-data track, which contains the dialog as text, with time stamps, for the media, can be utilized as a coarse dialog indicator. This indicator can be used to help in the equalization of the dynamic range, as an analog process applied to the soundtrack audio waveform, prior to processing using the various DNNs. In the absence of an available CC meta-data track, one can be developed by pre-processing the show through a speech recognizer which outputs (with about 60 to 90+% accuracy), the time stamps and text of the audio, which is suitable to establish where in the audio the dialog is present and should be emphasized, and where it is not present.

It will be appreciated that the embodiments described above and illustrated in the drawings represent only a few of the many ways of implementing embodiments for neutralizing distortion in audio data. In addition, characteristics or features of embodiments of the present invention may be combined in any fashion to provide additional embodiments of the present invention.

Having described preferred embodiments of a new and improved system, method, and computer program product for neutralizing distortion in audio data, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method for neutralizing distortion in audio data comprising:

producing, via at least one processor of a transmitting device, candidate audio signals by applying distortions to initial audio signals;

processing, via the at least one processor, the candidate audio signals to produce resulting audio signals representing the candidate audio signals after transmission to a receiving device;

generating, via the at least one processor, transcriptions of the initial audio signals and the resulting audio signals;

determining, via the at least one processor, intelligibility scores for the transcriptions of the initial audio signals and the resulting audio signals;

generating, via the at least one processor, a training set by selecting the initial audio signals and corresponding resulting audio signals based on the intelligibility scores for the transcriptions;

training, via the at least one processor, a machine learning model to produce a distorted audio signal based on the training set;

processing, via the machine learning model of the at least one processor, an audio signal from an audio portion of a media signal containing media to produce the distorted audio signal, wherein the distorted audio signal compensates for distortion from transmission of the audio signal to the receiving device and provides greater intelligibility relative to the audio signal; and transmitting the distorted audio signal produced from the media signal to the receiving device for presentation of the media.

2. A system for neutralizing distortion in audio data comprising:

one or more memories; and at least one processor of a transmitting device coupled to the one or more memories, and configured to:

produce candidate audio signals by applying distortions to initial audio signals;

process the candidate audio signals to produce resulting audio signals representing the candidate audio signals after transmission to a receiving device;

generate transcriptions of the initial audio signals and the resulting audio signals;

determine intelligibility scores for the transcriptions of the initial audio signals and the resulting audio signals;

generate a training set by selecting the initial audio signals and corresponding resulting audio signals based on the intelligibility scores for the transcriptions;

train a machine learning model to produce a distorted audio signal based on the training set;

process, via the machine learning model, an audio signal from an audio portion of a media signal containing media to produce the distorted audio signal, wherein the distorted audio signal compensates for distortion from transmission of the audio signal to the receiving device and provides greater intelligibility relative to the audio signal; and enable transmission of the distorted audio signal produced from the media signal to the receiving device for presentation of the media.

3. A computer program product for neutralizing distortion in audio data, the computer program product comprising one or more non-transitory computer readable storage media having program instructions stored thereon, the program instructions executable by at least one processor of a transmitting device to cause the at least one processor to:

produce candidate audio signals by applying distortions to initial audio signals;

process the candidate audio signals to produce resulting audio signals representing the candidate audio signals after transmission to a receiving device;

generate transcriptions of the initial audio signals and the resulting audio signals;

determine intelligibility scores for the transcriptions of the initial audio signals and the resulting audio signals;

generate a training set by selecting the initial audio signals and corresponding resulting audio signals based on the intelligibility scores for the transcriptions;

train a machine learning model to produce a distorted audio signal based on the training set;

process, via the machine learning model, an audio signal from an audio portion of a media signal containing media to produce the distorted audio signal, wherein the distorted audio signal compensates for distortion from transmission of the audio signal to the receiving device and provides greater intelligibility relative to the audio signal; and enable transmission of the distorted audio signal produced from the media signal to the receiving device for presentation of the media.

4. The method of claim 1, wherein the audio signal includes a plurality of audio channels.

5. The method of claim 1, wherein the distorted audio signal provides greater intelligibility for dialogue in the media signal.

6. The method of claim 1, wherein the distortions applied to the initial audio signals include one or more from a group of: frequency distortions, amplitude distortions, and phase distortions.

7. The method of claim 1, wherein processing the candidate audio signals includes:

encoding the candidate audio signals according to encoding used for transmission, via a codec, to produce encoded audio signals; and decoding the encoded audio signals, via the codec, to produce the resulting audio signals.

8. The method of claim 1, wherein the intelligibility scores are determined based on one or more from a group of a PESQ scoring technique and a POLQA scoring technique.

9. The method of claim 1, wherein generating the training set includes:

iteratively examining the resulting audio signals associated with an initial audio signal; and selecting a resulting audio signal corresponding to the initial audio signal for the training set based on an intelligibility score for the resulting audio signal being equal to or higher than an intelligibility score for the initial audio signal.

10. The system of claim 2, wherein the audio signal includes a plurality of audio channels.

11. The system of claim 2, wherein the distorted audio signal provides greater intelligibility for dialogue in the media signal.

12. The system of claim 2, wherein the distortions applied to the initial audio signals include one or more from a group of: frequency distortions, amplitude distortions, and phase distortions.

13. The system of claim 2, wherein processing the candidate audio signals includes:

encoding the candidate audio signals according to encoding used for transmission, via a codec, to produce encoded audio signals; and decoding the encoded audio signals, via the codec, to produce the resulting audio signals.

14. The system of claim 2, wherein generating the training set includes:

iteratively examining the resulting audio signals associated with an initial audio signal; and selecting a resulting audio signal corresponding to the initial audio signal for the training set based on an intelligibility score for the resulting audio signal being equal to or higher than an intelligibility score for the initial audio signal.

15. The computer program product of claim 3, wherein the audio signal includes a plurality of audio channels.

16. The computer program product of claim 3, wherein the distorted audio signal provides greater intelligibility for dialogue in the media signal.

17. The computer program product of claim 3, wherein the distortions applied to the initial audio signals include one or more from a group of: frequency distortions, amplitude distortions, and phase distortions.

18. The computer program product of claim 3, wherein processing the candidate audio signals includes:

encoding the candidate audio signals according to encoding used for transmission, via a codec, to produce encoded audio signals; and decoding the encoded audio signals, via the codec, to produce the resulting audio signals.

19. The computer program product of claim 3, wherein the intelligibility scores are determined based on one or more from a group of a PESQ scoring technique and a POLQA scoring technique.

20. The computer program product of claim 3, wherein generating the training set includes:

iteratively examining the resulting audio signals associated with an initial audio signal; and selecting a resulting audio signal corresponding to the initial audio signal for the training set based on an intelligibility score for the resulting audio signal being equal to or higher than an intelligibility score for the initial audio signal.

* * * * *